US011900926B2

(12) United States Patent
Bateman

(10) Patent No.: US 11,900,926 B2
(45) Date of Patent: Feb. 13, 2024

(54) DYNAMIC EXPANSION OF ACRONYMS IN AUDIO CONTENT

(71) Applicant: Microsoft Technology Licensing, LLC, Redmond, WA (US)

(72) Inventor: Amelia Bateman, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 17/063,159

(22) Filed: Oct. 5, 2020

(65) Prior Publication Data

US 2022/0108691 A1   Apr. 7, 2022

(51) Int. Cl.
*G10L 15/197*   (2013.01)
*G10L 15/26*   (2006.01)

(52) U.S. Cl.
CPC ............ *G10L 15/197* (2013.01); *G10L 15/26* (2013.01)

(58) Field of Classification Search
CPC ... G10L 15/197; G10L 15/26; G10L 21/0364; G06F 40/242
See application file for complete search history.

(56) References Cited

U.S. PATENT DOCUMENTS

| | | | | |
|---|---|---|---|---|
| 6,785,869 | B1 | 8/2004 | Berstis | |
| 8,868,409 | B1* | 10/2014 | Mengibar | G06F 40/30 |
| | | | | 704/250 |
| 8,909,683 | B1* | 12/2014 | Ledet | H04L 67/02 |
| | | | | 707/804 |
| 10,594,757 | B1* | 3/2020 | Shevchenko | H04L 67/306 |
| 2004/0187084 | A1* | 9/2004 | Berstis | G06F 40/232 |
| | | | | 707/E17.005 |
| 2007/0174045 | A1* | 7/2007 | Kao | G06F 40/295 |
| | | | | 704/4 |
| 2014/0046661 | A1* | 2/2014 | Bruner | H04N 21/6582 |
| | | | | 704/235 |
| 2014/0136567 | A1* | 5/2014 | Bhalotia | G06F 16/3338 |
| | | | | 707/771 |

(Continued)

FOREIGN PATENT DOCUMENTS

EP   3523710 A1   8/2019

OTHER PUBLICATIONS

"International Search Report and Written Opinion Issued in PCT Application No. PCT/US21/043809", dated Nov. 15, 2021, 16 Pages.

(Continued)

*Primary Examiner* — Bhavesh M Mehta
*Assistant Examiner* — Darioush Agahi
(74) *Attorney, Agent, or Firm* — NovoTechIP International PLLC

(57) ABSTRACT

Examples of the present disclosure describe systems and methods for dynamically expanding acronyms in audio content. In aspects, a user access of an audio resource may be detected. The audio content of the audio resource may be evaluated to identify acronyms. One or more of the identified acronyms may be evaluated based on a user-specific context of the user and/or a global context associated with the user. Based on the evaluated context(s), expansion candidates and corresponding confidence scores may be determined for each identified acronym. Based on the confidence scores, an expansion candidate may be selected and used to replace the identified acronym when the audio content is consumed by the user.

21 Claims, 9 Drawing Sheets

(56) References Cited

U.S. PATENT DOCUMENTS

| | | | | |
|---|---|---|---|---|
| 2016/0105386 A1* | 4/2016 | Anders | ............... | G06F 40/157 |
| | | | | 709/206 |
| 2017/0076713 A1* | 3/2017 | Gildein, II | ............... | H04N 7/15 |
| 2017/0199963 A1* | 7/2017 | Kondadadi | ............ | G16H 15/00 |
| 2018/0063270 A1* | 3/2018 | Naar | ....................... | H04L 67/02 |
| 2019/0171728 A1* | 6/2019 | Wakankar | ......... | G06F 16/90324 |
| 2019/0179898 A1* | 6/2019 | Jetley | ..................... | G06F 9/453 |
| 2020/0394362 A1* | 12/2020 | Lee | .................... | G06F 3/04842 |
| 2022/0084527 A1* | 3/2022 | Silverstein | ........... | G06Q 10/105 |

OTHER PUBLICATIONS

"Predictive Disambiguation of Acronyms", In IP.com Prior Art Database, Aug. 5, 2019, 3 Pages.

* cited by examiner

DYNAMIC EXPANSION OF ACRONYMS IN AUDIO CONTENT

BACKGROUND

Acronyms are convenient tools for expressing essential information in a brief format. However, if an audience is unaware of the meaning or context of the acronym, the audience's comprehension of the content in which the acronym is presented may be negatively impacted. The negative impact is exacerbated when the content is presented in an audio format because the audience may not simply look back through the text of the content to identify the expanded acronym. Instead, the audience must restart the audio content and listen until the acronym is expanded or randomly skip around the audio content searching for the expanded acronym. Both of these scenarios are undesirable and may significantly degrade the user experience when listening to audio content.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for dynamically expanding acronyms in audio content. In aspects, a user access of an audio resource may be detected. The audio content of the audio resource may be evaluated to identify acronyms. One or more of the identified acronyms may be evaluated based on a user-specific context of the user and/or a global context associated with the user. Based on the evaluated context(s), expansion candidates and corresponding confidence scores may be determined for each identified acronym. Based on the confidence scores, an expansion candidate may be selected and used to replace the identified acronym when the audio content is consumed by the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
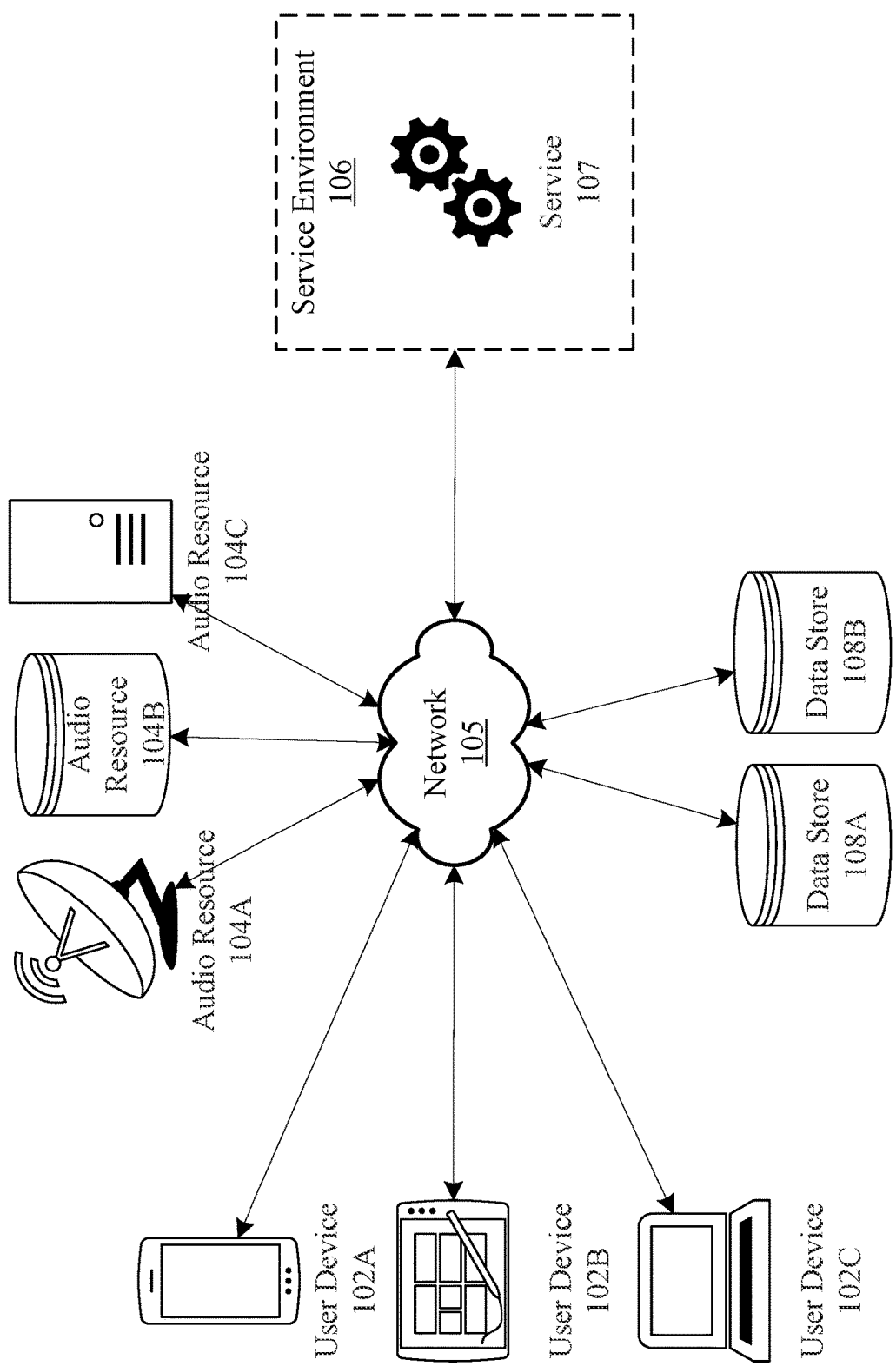
FIG. 1 illustrates an overview of an example system for dynamically expanding acronyms in audio content as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Acronyms are ubiquitously used in various forms of content. Given this ubiquity, the sheer volume of acronyms that currently exist often make is difficult to decipher the intended meaning of a particular acronym. This problem is exacerbated by authors that include acronyms in their content without also including the full expansion of the acronyms at least one time (as is standard in published texts). However, even when an author includes the full expansion of an acronym in their content one time, the audience may still have to search the content to identify the full expansion of the acronym. When the content is in a text format, the search for the full expansion of the acronym may be efficiently performed using text-based search tools. However, when the content is in an audio format, the search for the full expansion of the acronym must be performed by restarting the audio content and listening until the acronym is expanded or randomly skipping around the audio content. Neither of these options is ideal, especially when the audio content is in long-form format.

To address the challenges with identifying acronyms an audio content, the present disclosure describes systems and methods for dynamically expanding acronyms in audio content. In aspects, a user may access or initiate an audio resource using a user device. The audio resources provide access to, for example, audio files, streaming audio data, and broadcast audio data. In response to the access or initiation of the audio resource, the audio content provided by the audio resource may be evaluated to identify whether the audio content comprises one or more acronyms. Audio content, as used herein, may refer to sounds and/or words that may be auditorily consumed (e.g., listened to) by listeners. Each identified acronym in the audio content may be evaluated to determine whether the user is familiar with the identified acronym. The familiarity evaluation may be based on a user-specific context of the user and/or a global context associated with the user.

In aspects, the user-specific context may refer to or define a manner in which an item (e.g., an object, an entity, an event, a concept or topic, a word or phrase) is related to or understood by a user. The user-specific context may be used to determine whether or the manner in which the identified acronym is understood by the user. In some examples, the user-specific context may be derived using content in one or more documents of the user. For example, the content (e.g., word, phrases, images, data) surrounding an acronym may be used to determine the meaning of the acronym. In other examples, the user-specific context may be derived using interaction information associated with the user's previous interactions with one or more documents. Examples of interaction information include document access information, document creation and/or modification information, document transmission (e.g., sending or receiving) information, document acquisition (e.g., purchase, rental, check-in/out) information, etc. For example, the meaning of the acronym may be determined using a document that comprises an expansion of the acronym and is authored by the user. In yet other examples, the user-specific context may be derived using affiliation information associated with the user's affiliations with one or more entities (e.g., persons, groups, organizations). Examples of affiliation information include expertise, experience, or knowledge information of entities associated with the user (e.g., friends, colleagues, group members, organizations), interaction information for such people or on those people's interactions with one or more documents. For example, the meaning of the acronym may be determined based on a user's relationship with an entity that is familiar with the acronym.

The global context may refer to or define a manner in which an item is related to or understood by one or more entities other than (or including) the user. The global context may be used to determine whether or the manner in which the identified acronym is understood by entities that may (or may not) be associated with the user. As such, the global context may be specific to a plurality of entities but may not be specific to the user. In some examples, the global context may be derived using content in one or more documents associated with one or more entities. For example, the global context may be derived using documents comprising a list of acronyms and provided by a data resource, such as a search engine, a government entity, or an organization. In other examples, the global context may be derived using information associated with the user's geographic location or profession. For example, documents comprising acronyms that have specific meanings in the user's geographic location (e.g., national, regional, or international acronym lists) or profession (e.g., profession manuals, technical standards documents) may be used to determine the meaning of the acronym.

The user-specific context and/or global context may be used to generate a list of expansion candidates for an identified acronym. The expansion candidates may be weighted, assigned confidence scores, and/or ranked based on the user-specific context and/or global context. The expansion candidate with the highest confidence score may be selected and compared to a confidence threshold. If the selected expansion candidate meets or exceeds the confidence threshold, the selected expansion candidate may be substituted for the identified acronym when the identified acronym is read aloud or otherwise auditorily presented in the audio content. If the selected expansion candidate does not meet or exceed the confidence threshold, the identified acronym may not be expanded in the audio content, or an alternate action may be performed.

Accordingly, the present disclosure provides a plurality of technical benefits including but not limited to: improving audience comprehension of audio content by enabling the dynamic expansion of acronyms in audio content, evaluating acronym expansion candidates based on user-specific contexts and global (e.g., non-user-specific) contexts, determining whether a user is familiar with an acronym before expanding the acronym, and preserving the original form of the audio content while performing acronym expansion, among other examples.

FIG. 1 illustrates an overview of an example system for dynamically expanding acronyms in audio content as described herein. Example system 100 as presented is a combination of interdependent components that interact to form an integrated whole. Components of the system may be hardware components or software components implemented on and/or executed by hardware components of the system. In one example, system 100 may provide an operating environment for software components to execute and utilize resources or facilities of system 100. An example of one or more processing devices comprising such an operating environment is depicted in FIGS. 5-8. In another example, the components of systems disclosed herein may be distributed across multiple devices. For instance, input may be entered on a client device and information may be processed on or accessed from other devices in a network, such as one or more remote cloud or web server devices.

As one example, system 100 comprises computing devices 102A, 102B, and 102C (collectively "user devices 102"), audio resources 104A, 104B, and 104C (collectively "audio resources 104"), network 105, service environment 106, and data stores 108A and 108B (collectively "data stores 108"). One of skill in the art will appreciate that the scale of systems such as system 100 may vary and may include additional or fewer components than those described in FIG. 1. For instance, in some examples, data stores 108 and/or service environment 106 may be integrated into a single environment, processing system, or device, such as user devices 102.

User devices 102 may be configured to receive or collect input from one or more users or data sources. Examples of user devices 102 include, but are not limited to, personal computers (PCs), mobile devices (e.g., smartphones, tablets, laptops, personal digital assistants (PDAs)), and wearable devices (e.g., smart watches, smart eyewear, fitness trackers, smart clothing, body-mounted devices). User devices 102 may provide one or more sensors and/or input modalities for receiving or collecting input. Example sensors and/or input modalities include microphones, touch-based sensors, keyboards, pointing/selection tools, optical/magnetic scanners, accelerometers, magnetometers, gyroscopes, etc. The collected input may include, for example, voice input, touch input, text-based input, gesture input, video input, and/or image input. User devices 102 may also provide one or more applications and/or services for enabling user to consume or otherwise interact with content. As one specific example, user devices 102 may comprise a media playback application that enables a user to consume (e.g., listen to) audio content provided by one or more data sources, such as audio resources 104.

Audio resources 104 may be configured to provide access to data resources comprising audio content, such as audio files, video files, presentation files, word processing documents, streaming data, broadcast data, etc. Examples of audio resources 104 include, but are not limited to, media player services and applications, audio/video repositories (e.g., internal or external databases or directories), audio broadcasting services (e.g., satellite radio, cable radio, local wire television networks, digital television), and audio streaming services or devices. In some examples, audio resources 104 may be available to user devices 102 via a communication channel, such as network 105. In other examples, at least a portion of audio resources 104 may be located and accessed locally on user devices 102.

Service environment 106 may be configured to provide one or more services to user devices 102. Service environment 106 may be provided by user devices 102 or by an alternate computing environment, such as a remote server, a distributed computing environment, or a cloud-based environment. In aspects, service environment 106 may comprise one or more services and/or applications, such as service(s) 107. Service(s) 107 may be integrated into a media player service/application, implemented as a plug-in or add-on to a media player service/application, or implemented separately from a media player service/application.

Service(s) 107 may be configured to play and/or evaluate audio content received and/or played by user devices 102. In some examples, user devices 102 may provide the audio content to service(s) 107 when a user elects to play or receive audio content. In other examples, service(s) 107 may monitor user devices 102 or components thereof. When service(s) 107 detects that a user elects to play or receive audio content, service(s) 107 may access of intercept the audio content provided to user devices 102. Upon accessing/intercepting the audio content intended for user devices 102, service(s) 107 may apply natural language processing (NLP) or audio recognition techniques to the audio content to identify whether the audio content comprises one or more acronyms. The NLP or audio recognition techniques may be applied in substantially real-time (e.g., as the audio content is being played by user devices 102) or prior to enabling user devices 102 to receive/play the audio content.

Upon determining the audio content comprises one or more acronyms, service(s) 107 may access one or more user resources specific to a particular user, such as data store 108A. Examples of data store 108A include graph databases, knowledge graphs, user models, user documents, user activity information, user contacts data, and information associated with user contacts (e.g., user contact graph databases, user contact knowledge graphs, user contact user model, user contact documents, user contact activity information, user contact contacts data). Service(s) 107 may also access one or more user resources that are associated with, but not specific to, a particular user, such as data store 108B. For example, such resources may relate to the user's geographic location, profession, role/title, group affiliation, etc. Examples of data store 108B include search engines, regional acronym lists/files, organizational acronym lists/files, and membership acronym lists/files.

In aspects, based on the evaluation of resources specific to and/or associated with the user, service(s) 107 may select an acronym expansion for one or more of the acronyms identified in the audio content. Service(s) 107 may cause the selected acronym expansion to be dynamically substituted for the acronym when the audio content is received/played by user devices 102. Service(s) 107 may also provide the selected acronym expansion to data stores 108 and/or user devices 102. Data stores 108 and/or user devices 102 may store the selected acronym expansion and use the selected acronym expansion to update data associated with the user. For example, the selected acronym expansion may be used to update or train a user model to correlate the acronym with the selected acronym expansion.

Figure 2:
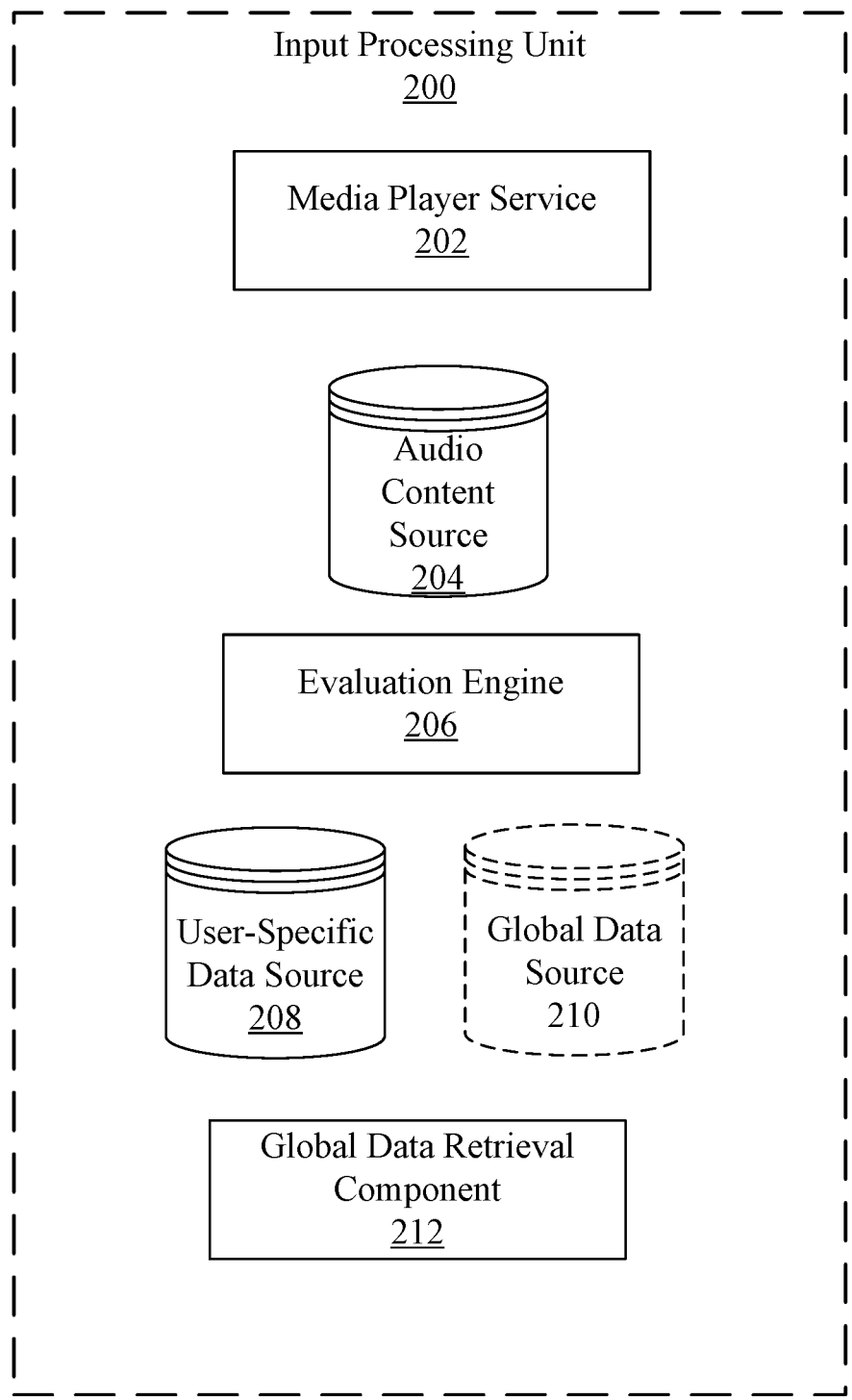
FIG. 2 illustrates an example input processing unit for dynamically expanding acronyms in audio content as described herein.

FIG. 2 illustrates an example input processing unit for dynamically expanding acronyms in audio content as described herein. The techniques implemented by input processing unit 200 may comprise the techniques and data described in system 100 of FIG. 1. Although examples in FIG. 2 and subsequent figures will be discussed in the context of audio files/content, the examples are equally applicable to other contexts, such as video files/content and other files/content comprising audio content. In some examples, one or more data and components described in FIG. 2 (or the functionality thereof) may be distributed across multiple devices. In other examples, a single device may comprise the data and components described in FIG. 2.

As one example, input processing unit 200 may comprise media player service 202, audio content source 204, evaluation engine 206, user-specific data source 208, global data source 210, and global data retrieval component 212. One of skill in the art will appreciate that the scale of input processing unit 200 may vary and may include additional or fewer components than those described in FIG. 2. For instance, in some examples, audio content source 204 may be located remotely to input processing unit 200 and/or the data retrieved by global data retrieval component 210 may be stored locally on input processing unit 200.

Media player service 202 may be configured to play media items accessible to input processing unit 200. At least a portion of the media items may comprise audio content. Upon receiving a user request to play, review, or otherwise interact with a media item, media player service 202 may attempt to access a data source comprising the requested media item, such as audio content source 204. Audio content source 204 may comprise various audio content, such as audio files, streaming audio data, and broadcast audio data. In some examples, at least a portion of the audio content provided by audio content source 204 may be located externally to input processing unit 200.

Evaluation engine 206 may be configured to evaluate audio content accessed by media player service 202. In some aspects, the audio content may be delivered to evaluation engine 206 prior to being delivered to media player service 202 or substantially concurrently with being delivered to media player service 202. For example, when a user indicates an intention to receive audio content via media player service 202, the audio content may first be delivered to evaluation engine 206. Alternately, evaluation engine 206 may receive a path/location of the audio file and credentials for accessing the path/location. In other aspects, a text version of the audio content may be provided to (or made accessible to) evaluation engine 206. For example, the text transcription of an audio recording may be provided to evaluation engine 206.

After receiving the audio content, evaluation engine 206 may evaluate the audio content to identify whether the audio content comprises one or more acronyms. The evaluation may include the use of one or more NLP or audio recognition techniques. For example, evaluation engine 206 may use NLP to create a text transcription of the audio content. Text-based analysis tools may then be used to identify acronyms in the transcription. Alternately, evaluation engine 206 may use speech recognition to compare the audio content to audio of known acronyms. For example, evaluation engine 206 may load portions of the audio content (e.g., 5-10 second chunks) into a circular buffer. Each portion loaded into the buffer may be compared to audio representing a list of known acronyms using speech recognition techniques, such as hidden Markov models (HMMs), artificial neural networks (ANNs), dynamic time warping (DTW), etc.

When an acronym is identified by evaluation engine 206, evaluation engine 206 may attempt to establish a user-specific context for the acronym. To establish the user-specific context, evaluation engine 206 may access user-specific data source 208. User-specific data source 208 may comprise information for a particular user, such as graph databases, knowledge graphs, user models, user documents, user activity information, user contacts data, and information associated with user contacts. As one example, evaluation engine 206 may access a graph database describing relationships between a user and one or more entities, files/documents, or other content. Evaluation engine 206 may search the files/documents to identify whether the files/documents comprise the acronym or the expansion of the acronym. If the acronym or the expansion of the acronym is identified in the files/documents, evaluation engine 206 may evaluate the relationships between the user and the files/documents. Based on the identified relationships, evaluation engine 206 may assign a weighting value ("weight") or score to an acronym or the expansion of the acronym. The weight or score may represent a confidence that an expansion of the acronym corresponds to an identified acronym. Alternately, the weight or score may represent a confidence that an acronym is known by or familiar to a user.

As another example, evaluation engine 206 may access a user model associated with a user. A user model, as used herein, may refer to a data structure comprising a collection of personal data associated with a particular user. The personal data may describe user demographic data, user account data, user interests, user skills and knowledge, relationships between the user and one or more entities, files/documents, or other content, etc. Evaluation engine 206 may search the user model to identify whether the personal data comprises an acronym or the expansion of the acronym. If one or more acronyms or the expansions thereof are identified in the personal data, evaluation engine 206 may create a list of acronym expansion candidates. Evaluation engine 206 may score and/or rank the list of acronym expansion candidates based on various criteria, such as relationships between the user and entities or content comprising the acronym or acronym expansion, content interaction information, frequency of acronym or acronym expansion occurrences within content, etc.

In some aspects, evaluation engine 206 may additionally or alternately attempt to establish a global context for the identified acronym. For example, if the score for an acronym expansion or an acronym expansion candidate identified using the user-specific context is determined to be below a threshold value, evaluation engine 206 may attempt to establish a global context. To establish the global context, evaluation engine 206 may access a global (e.g., user-independent) data source, such as global data source 210. Global data source 210 may be locally accessible to input processing unit 200. Alternately, a data retrieval component, such as global data retrieval component 212, may be used to access a global data source. Global data retrieval component 212 may be configured to retrieve acronym information from global data sources external to input processing unit 200, such as search engines, organizations, government offices, etc. A global data source may comprise information, such as acronym data, for one or more countries or geographic locations. The acronym data may comprise lists of popular, known, or recognized acronyms and their respective expansions. Evaluation engine 206 may search the acronym data for an acronym expansion corresponding to the identified acronym. If a corresponding acronym expansion is identified in the acronym data, evaluation engine 206 may assign a weight or score to an acronym or the acronym expansion. Alternately, evaluation engine 206 may update a previously assigned weight or score for an acronym or the acronym expansion. For instance, evaluation engine 206 may combine a weight or score for an acronym expansion identified using a user-specific context with a weight or score for the acronym expansion identified using a global context to generate a final or total confidence score for the acronym expansion.

Evaluation engine 206 may compare the generated confidence score for the acronym expansion to a confidence threshold. If the final or total confidence score meets or exceeds the confidence threshold, evaluation engine 206 may cause the acronym expansion to be substituted for the identified acronym in the audio content when the audio content is read aloud or otherwise auditorily presented. For example, the provide an indication of the acronym expansion to media player service 202. Media player service 202 may then substitute the acronym expansion for one or more occurrences of the identified acronym when the audio content is read aloud or otherwise auditorily presented. Alternately, evaluation engine 206 may alter the audio content to substitute the acronym expansion for one or more occurrences of the identified acronym. For instance, the evaluation engine 206 may substitute the first occurrence of the identified acronym with a customized version of the acronym expansion. The customized version of the acronym expansion may or may not be consistent with the audio characteristics of the audio content.

If the generated confidence score does not meet or exceed the confidence threshold, evaluation engine 206 may not cause the acronym expansion to be substituted for the identified acronym in the audio content when the audio content is read aloud or otherwise auditorily presented. Instead, evaluation engine 206 may cause an alternate action to be performed. For example, evaluation engine 206 may cause the unexpanded acronym to be used (e.g., read) when the audio content is read aloud or otherwise auditorily presented. Alternately, evaluation engine 206 may notify the user that an acronym expansion could not be identified or confidently determined. In such an example, evaluation engine 206 may cause a feedback query to be presented to the user. The feedback query may solicit feedback from the user regarding the correct expansion for the identified acronym.

Having described various systems that may be employed by the aspects disclosed herein, this disclosure will now describe one or more methods that may be performed by various aspects of the disclosure. In aspects, methods 300 and 400 may be executed by a system, such as system 100 of FIG. 1, or an execution environment or device, such as input processing unit 200 of FIG. 2. However, methods 300 and 400 are not limited to such examples. In other aspects, methods 300 and 400 may be performed by a single device comprising an application or service that integrates the functionality of media service player 202, evaluation engine 206, and/or global data retrieval component 212. In at least one aspect, methods 300-400 may be performed by one or more components of a distributed network, such as a web service/distributed network service (e.g. cloud service).

Figure 3:
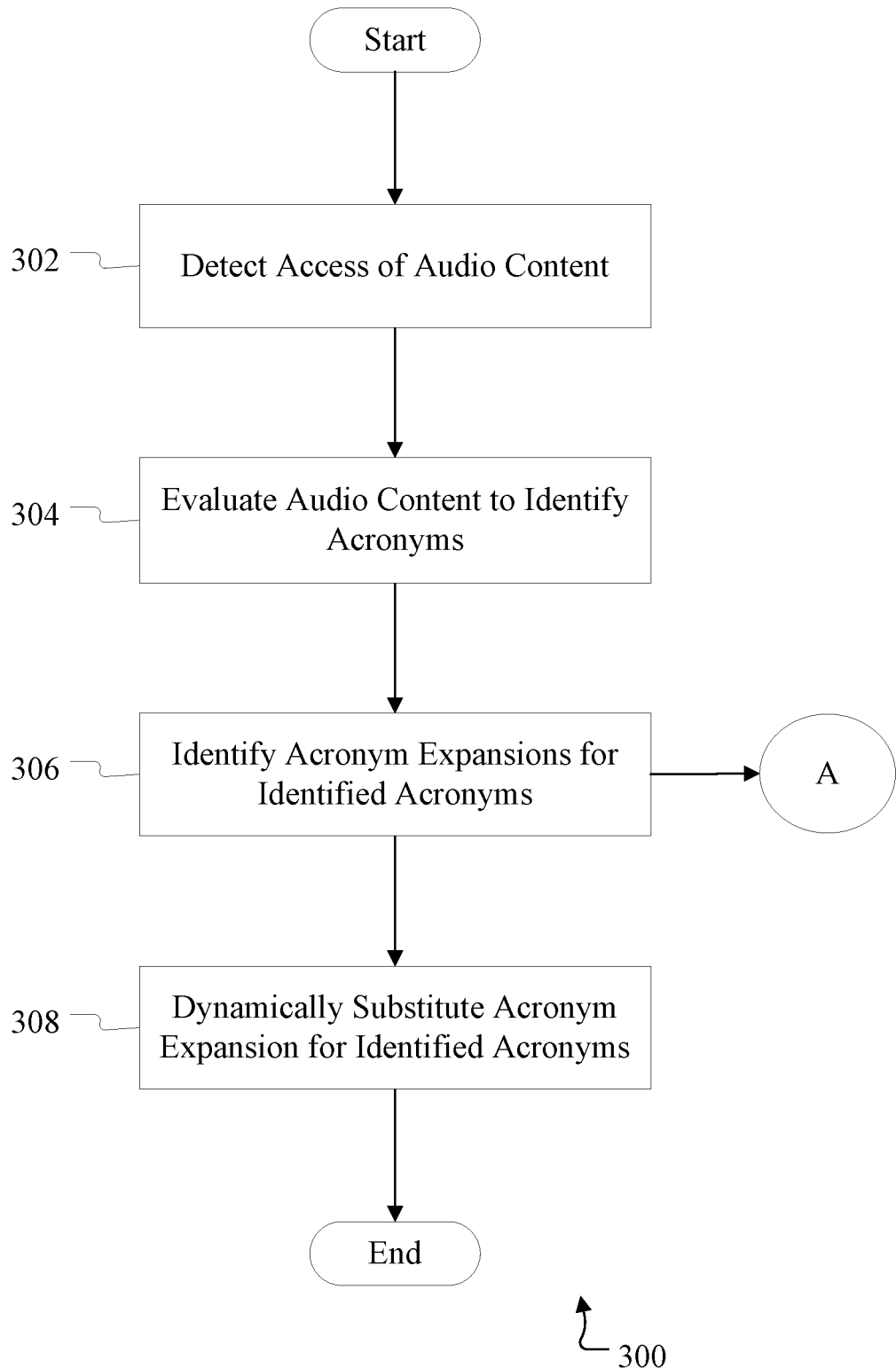
FIG. 3 illustrates an example method for dynamically expanding acronyms in audio content as described herein.

FIG. 3 illustrates an example method for dynamically expanding acronyms in audio content. Example method 300 begins at operation 302, where a request to access (e.g., play or receive) audio content is detected. In aspects, a user may provide an audio request to a media player component, such as media player service 202, of a computing device, such as input processing unit 200. The audio request may indicate the user's intent to play or receive a data resource comprising audio content, such as audiobooks, podcasts, webinars, audio blogs, webcasts, radio content, newscasts, streaming data, etc. In response to receiving the audio request, an audio evaluation mechanism, such as evaluation engine 206, may be provided with the audio content, a path to or location of the audio content, and/or credentials for accessing the audio content. The audio evaluation mechanism may be integrated into the media player component (e.g., as a plug-in, add-on, extension), implemented as a separate service/application of the computing device, or implemented as a service/application external to the computing device.

At operation 304, the accessed audio content of the data resource may be evaluated using the audio evaluation mechanism. The evaluation may be performed in substantially real-time with respect to the request to access the audio content, the access of the audio content, or the delivery of the audio content to the audio evaluation mechanism. The evaluation may comprise applying NLP or audio recognition techniques to the accessed audio content to identify whether the accessed audio content comprises one or more acronyms. For example, an NLP algorithm configured to identify and extract acronyms in audio content may be applied to the accessed audio content. The NLP algorithm may create a list of acronyms comprising each of the acronyms in the accessed audio content. Alternately, the evaluation may comprise accessing a text (or text-based) version of the accessed audio content. For example, a path to or location of a text transcript of the accessed audio content may be provided to or identified by the audio evaluation mechanism. Text-based analysis tools (e.g., regular expressions, fuzzy search logic, wildcard search logic, and other pattern matching techniques) may be used to identify and extract acronyms in the text transcript.

At operation 306, acronym expansions may be identified for one or more acronyms identified in the audio content ("identified acronyms"). In aspects, one or more occurrences of each of the identified acronyms may be evaluated. For example, each of the identified acronyms may be evaluated or only the first occurrence of each of the identified acronyms may be evaluated. The evaluation may comprise establishing a user-specific context for identified acronyms. To establish the user-specific context, the audio evaluation mechanism may access one or more user data sources comprising data relating to the user, such as user-specific data source 208. Content (e.g., documents, contact data, interaction data) in the user data source(s) may be searched to identify the identified acronyms and/or expansions thereof ("acronym expansions"). When an identified acronym or a corresponding acronym expansion is identified in a user data source, the audio evaluation mechanism may evaluate the properties and/or interaction data for the user data source. Based on the evaluation of the properties and/or interaction data for one or more user data sources, a weight or a score may be assigned to one or more potential acronym expansion. The weight or score may represent a confidence that an acronym expansion corresponds to an identified acronym.

In some aspects, the evaluation may further comprise establishing a global context for identified acronyms. To establish the global context, the audio evaluation mechanism may access one or more global data sources comprising data relating to one or more entities that may (or may not) be associated with the user, such as global data source 210. Content (e.g., lists of popular, known, or recognized acronyms and acronym expansions) in the global data source(s) may be searched to identify the identified acronyms and/or acronym expansions. When an identified acronym and a corresponding acronym expansion is identified in a global data source, the audio evaluation mechanism may assign a weight or score to the acronym expansion. Alternately, a previously assigned weight or score for an acronym expansion may be updated. For example, a weight or score for a user-specific context of an identified acronym may be combined with or modified using a weight or score for a global context of the identified acronym. The resulting weight or score may be assigned to the acronym expansion.

At operation 308, one or more acronym expansion may be dynamically substituted for a corresponding acronym in the audio content. In aspects, the audio evaluation mechanism may compare the weight or score assigned to an acronym expansion to a confidence threshold. If the weight or score meets or exceeds the confidence threshold, the audio evaluation mechanism may cause the acronym expansion to be substituted for one or more instances of identified acronym when the audio content is read aloud or otherwise auditorily presented. For example, each instance of the identified acronym may be dynamically replaced with the acronym expansion when the audio content is played by the media player component. If the weight or score does not meet or exceed the confidence threshold, the audio evaluation mechanism may not cause or enable the acronym expansion to be substituted for the identified acronym when the audio content is read aloud or otherwise auditorily presented. As one example, the audio evaluation mechanism may notify the user (or cause the user to be notified) that an acronym expansion could not be identified or confidently determined. The audio evaluation mechanism may further prompt the user to provide an acronym expansion for an identified acronym or a context for the identified acronym. For instance, the user may indicate that the identified acronym is used in the "Machine Learning" context. As a result, the audio evaluation mechanism may search resources relating to machine learning for an acronym expansion corresponding to the identified acronym.

Figure 4:
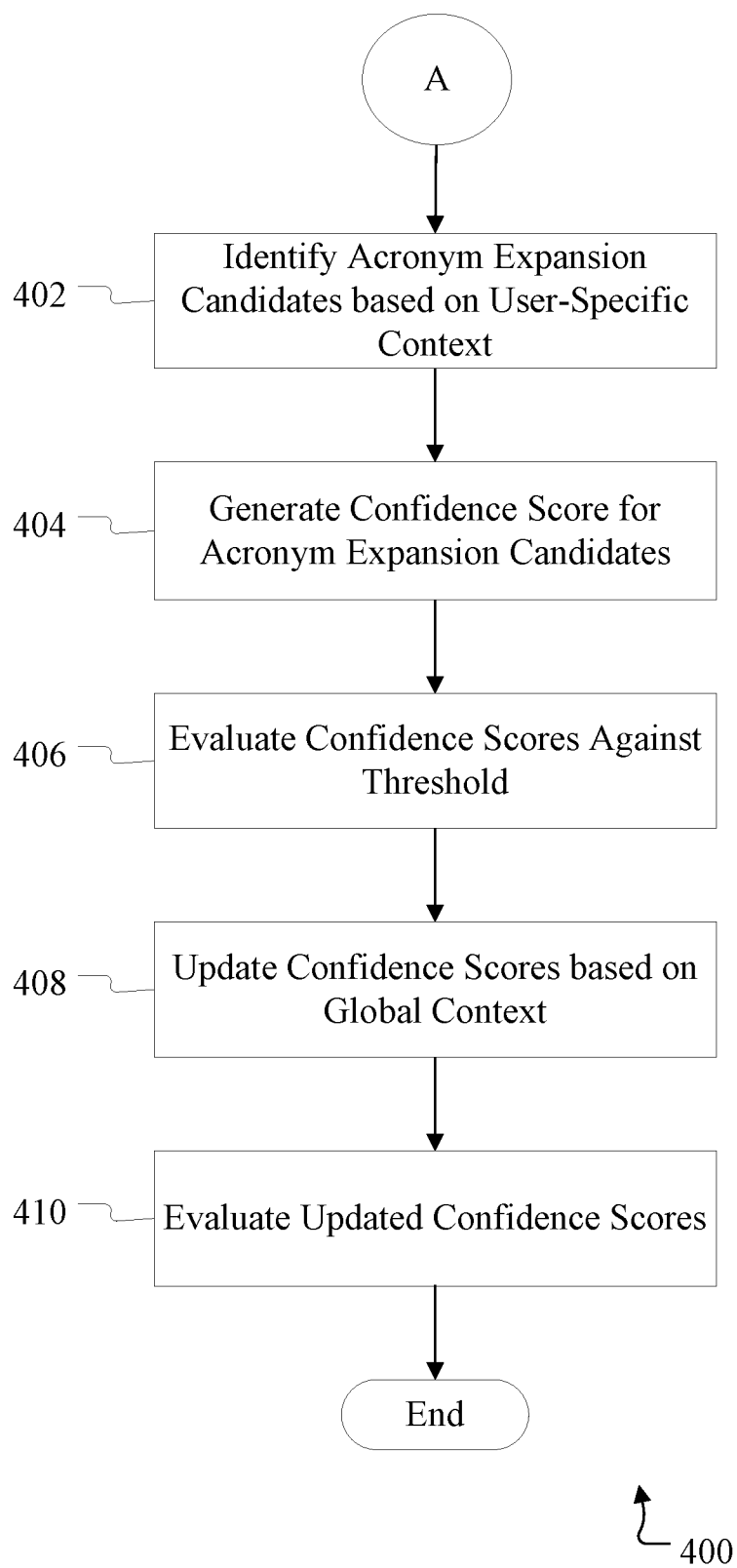
FIG. 4 illustrates an example method for identifying acronym expansion for acronyms identified in audio content as described herein.

FIG. 4 illustrates an example method for identifying acronym expansion for acronyms identified in audio content. Example method 400 begins at operation 402, where a user-specific context analysis is performed for an identified acronym. In aspects, when an acronym is identified in audio content accessed by a user's user device, an audio evaluation mechanism, such as evaluation engine 206, may search user-specific content for the user. The user-specific content may include graph databases, knowledge graphs, user models, user documents, user activity information, user contacts data, and information associated with the user's contacts. The audio evaluation mechanism may search the user-specific content for the identified acronym and/or a corresponding acronym expansion. As a specific example, one or more occurrences of the acronym "PMP" may be identified in a podcast being streamed to a user's device. The audio evaluation mechanism may have access to a graph database for the user stored on (or accessible to) the user's device. The audio evaluation mechanism may search the documents and/or entities of the graph database for the acronym PMP. When the acronym is found in a document, the acronym, the corresponding acronym expansion (if available), and/or a document identifier for the document may be extracted and added to a list of acronym expansion candidates.

At operation 404, a confidence score may be generated for one or more acronym expansion candidates based on a user-specific context. Acronym expansion candidates may be evaluated using one or more scoring techniques, such as a scoring algorithm, a scoring model, or a set of rules. The evaluation may include an analysis of the relationships between the user and the respective documents and/or the interaction information of the documents. For example, the acronym PMP may be identified in three of the documents in the user's graph database. In the first document, the acronym PMP is defined as "portable media player." In the second document, the acronym PMP is defined as "project management professional." In the third document, the acronym PMP is defined as "portable media player." The audio evaluation mechanism may analyze the relationships (e.g., edges) between the user node and document nodes of the graph database to identify that the first document was recently authored by the user, the second document was recently sent by the user as an email attachment, and the third document was authored 5 years ago by a user contact of the user.

The audio evaluation mechanism may assign scores to the acronym expansions based on a set of rules in which document interaction recency and user interaction type are prioritized. For instance, the acronym expansions in the first and second document may be assigned a score or 1.0 because due to recent user interactions with the documents, whereas the acronym expansion in the third document may be assigned a lower score of 0.5 due to less recent user interaction with the document. Moreover, the acronym expansion in the first document may receive a weight of 3.0 because it was authored by the user, the acronym expansion in the second document may receive a weight of 1.5 because it was sent by the user, and the acronym expansion in the third document may receive a weight of 1.0 because it was authored by a contact associated with the user. Accordingly, the acronym expansion in the first document may be assigned a score of 3.0 (1.0*3.0), the acronym expansion in the second document may be assigned a score of 1.5 (1.0*1.5), and acronym expansion in the third document may be assigned a score of 0.5 (0.5*1.0). The scores for each acronym expansion may then be generated, such that the acronym expansion "portable media player" is assigned a score of 3.5 (3.0+0.5) and the acronym expansion "project management professional" is assigned a score of 1.5. The acronym expansion having the highest score may be selected to represent the user-specific context.

At operation 406, the confidence score for the acronym expansion based on the user-specific context ("user-specific confidence score") may be evaluated. The evaluation may include comparing the user-specific confidence score to a threshold value. Based on the result of the comparison, the audio evaluation mechanism may determine whether the user is familiar with the acronym. For example, if the user-specific confidence score meets or exceeds the threshold value, the audio evaluation mechanism may determine that the user is familiar with the acronym. As a result of the determination, the audio evaluation mechanism may provide an indication that the acronym expansion is not to be used when the audio content is read aloud or otherwise auditorily presented by the user's user device. Alternately, the audio evaluation mechanism may provide an indication that the acronym expansion is to be used when the audio content is read aloud or otherwise auditorily presented by the user's user device. If the user-specific confidence score does not meet or exceed the threshold value (indicating the user is unfamiliar with the acronym), the audio evaluation mechanism may perform additional analysis for an identified acronym.

At operation 408, a confidence score may be generated or updated for one or more acronym expansion candidates based on a global context. Acronym expansion candidates may be evaluated using one or more scoring techniques, as described above. The evaluation may include an analysis of global data comprising one or more curated (or non-curated) acronyms lists provided by a search engine, an organization, a government entity, etc. For example, the audio evaluation mechanism may access search engine results for the acronym PMP. The search results may indicate two acronym expansion candidates for the country in which the user is located. Each of the acronym expansion candidates may correspond to a separate region of the country. The audio evaluation mechanism may identify the user's current location or historically predominant location using location data, such as global positioning system (GPS) data, cellular network data, etc. Based on the location data, the audio evaluation mechanism may select a region of the country most relevant to the user. The acronym expansion candidate in the search results that corresponds to the selected region may be selected. Alternately, the audio evaluation mechanism may assign a score to one or more of the acronym expansion candidates, such that the acronym expansion candidate corresponding to the region most relevant to the user is assigned a higher score than the acronym expansion candidate corresponding to the less relevant (or irrelevant) region.

The audio evaluation mechanism may also or alternately access a list of acronyms provided by an organization or group associated with the user. For instance, the organization employing the user may provide a curated list of acronym and acronym expansions relating to the organization or one or more areas of knowledge. The audio evaluation mechanism may evaluate the user-specific content for the user to identify the user's profession, responsibilities, interests, skills and knowledge, etc. As a specific example, the user may be employed as a software engineer by a technology company. The user may work on Smart Card development, the standards for which are provided by International Standards Organization (ISO) 7816. The audio evaluation mechanism may the user-specific content for the user to determine that the user has accessed various documents relating to ISO standards and Smart Cards. As a result, audio evaluation mechanism may execute a web search using the terms "ISO" and "smart card." The audio evaluation mechanism may search the web results for the acronym "PMP." Because the PMP may be defined repeatedly in the web results as "portable media player," the audio evaluation mechanism may select "portable media player" as the correct acronym expansion. Alternately, the audio evaluation mechanism may create a list of acronym expansion candidates comprising each unique acronym expansion for PMP found in the web results.

Based on a selection of one or more acronym expansion candidates from the global data, the audio evaluation mechanism may generate or update a confidence score for the acronym expansion candidates. For instance, continuing from the above example, the audio evaluation mechanism may provide the acronym expansion "portable media player" a score of 1.0 because it was found in the regional acronym list and a score of 1.5 because it was found in the curated acronym list provided by the user's organization. The score for the user-specific context for the identified acronym PMP (e.g., 3.0) may be combined with or modified using the score for the global context for the identified acronym PMP (e.g., 1.0+1.5=2.5) to create a total score of 5.5 (e.g., 3.0+2.5). Alternately, the score for the global context for an identified acronym may be used to replace the user-specific confidence score. When multiple acronym expansion candidates are identified using the global data, the acronym expansion having the highest score may be selected to represent the global context.

At operation 410, the confidence score for the acronym expansion based on the user-specific confidence score and/or the global context ("global confidence score") may be evaluated. The evaluation may include comparing the global confidence score to the threshold value described above. Based on the result of the comparison, the audio evaluation mechanism may determine one or more actions to perform. For example, if the global confidence score meets or exceeds the threshold value, the audio evaluation mechanism may provide an indication that the acronym expansion is to be used when the audio content is read aloud or otherwise auditorily presented by the user's user device. Alternately, audio evaluation mechanism may cause the acronym expansion to be used when the audio content is read aloud or otherwise auditorily presented by the user's user device. If the global confidence score does not meet or exceed the threshold value, the audio evaluation mechanism may provide one or more alternate actions. For example, the audio evaluation mechanism may notify the user that an acronym expansion could not be identified or confidently determined. As another example, the audio evaluation mechanism may cause the acronym to be read aloud or otherwise auditorily presented without substituting the acronym expansion. As yet another example, the audio evaluation mechanism may cause the acronym to be replaced with the acronym expansion candidate having the highest score.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
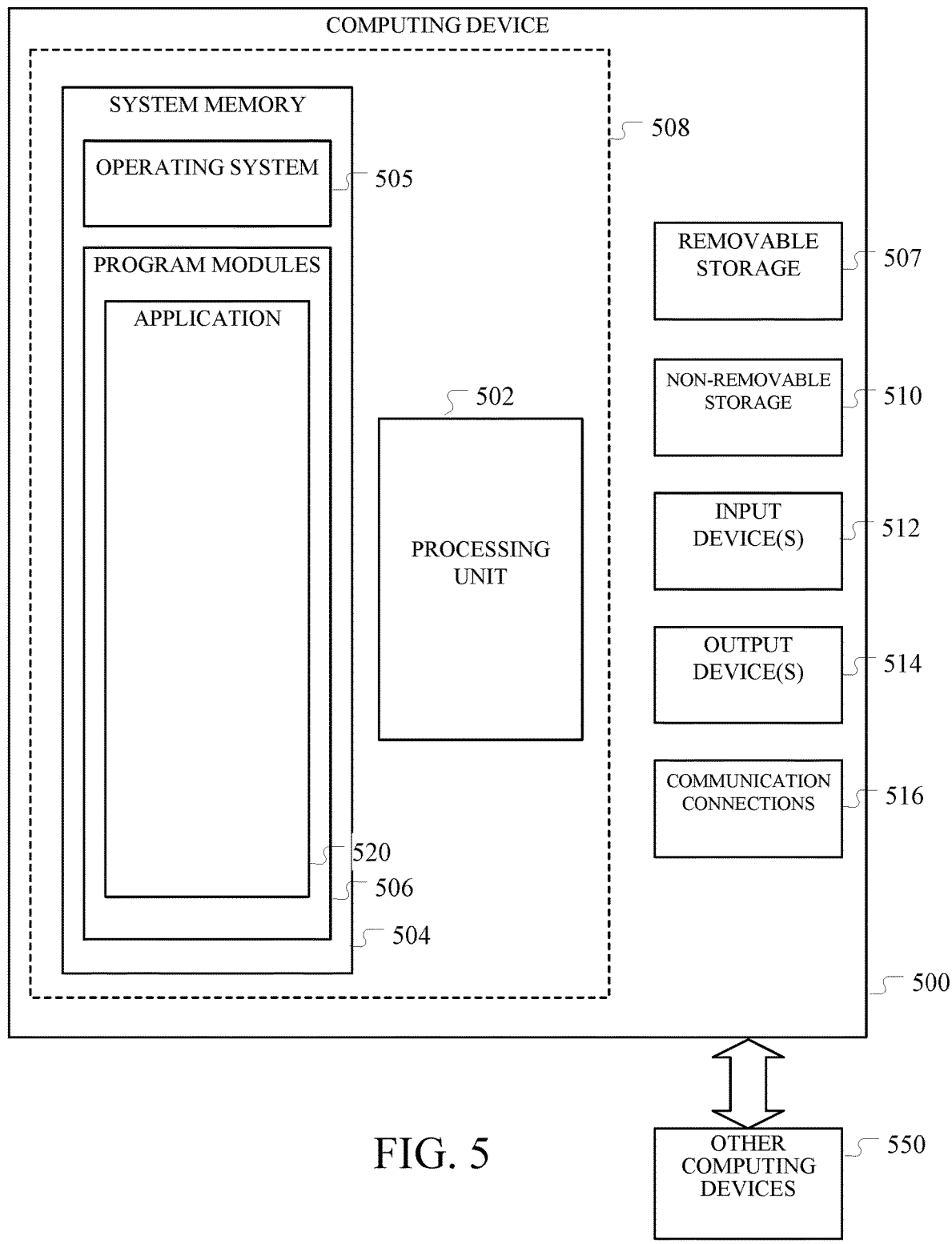
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices and systems described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
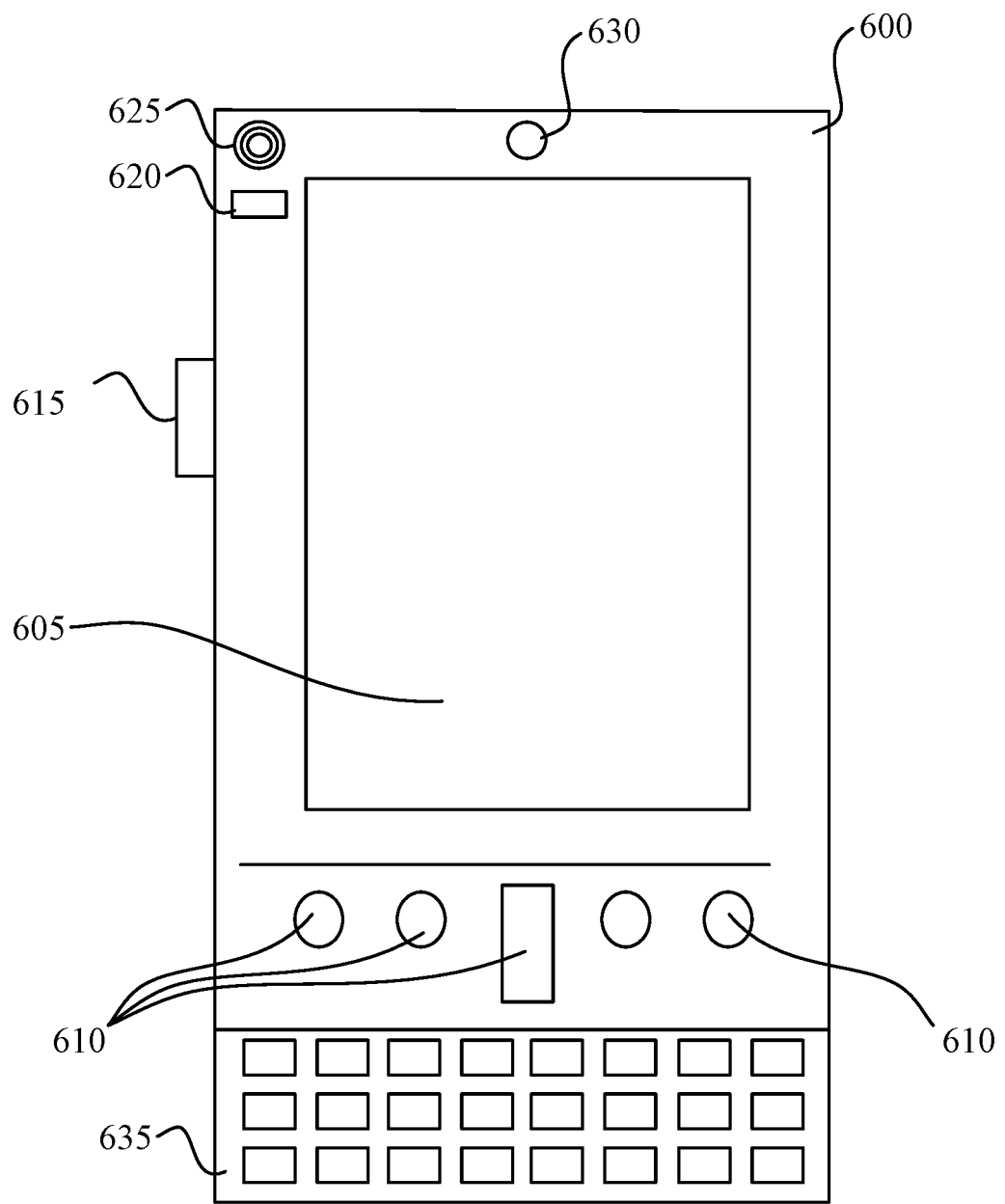
FIGS. 6A and 6B are simplified block diagrams of a mobile computing device with which aspects of the present disclosure may be practiced.
Figure 6B:
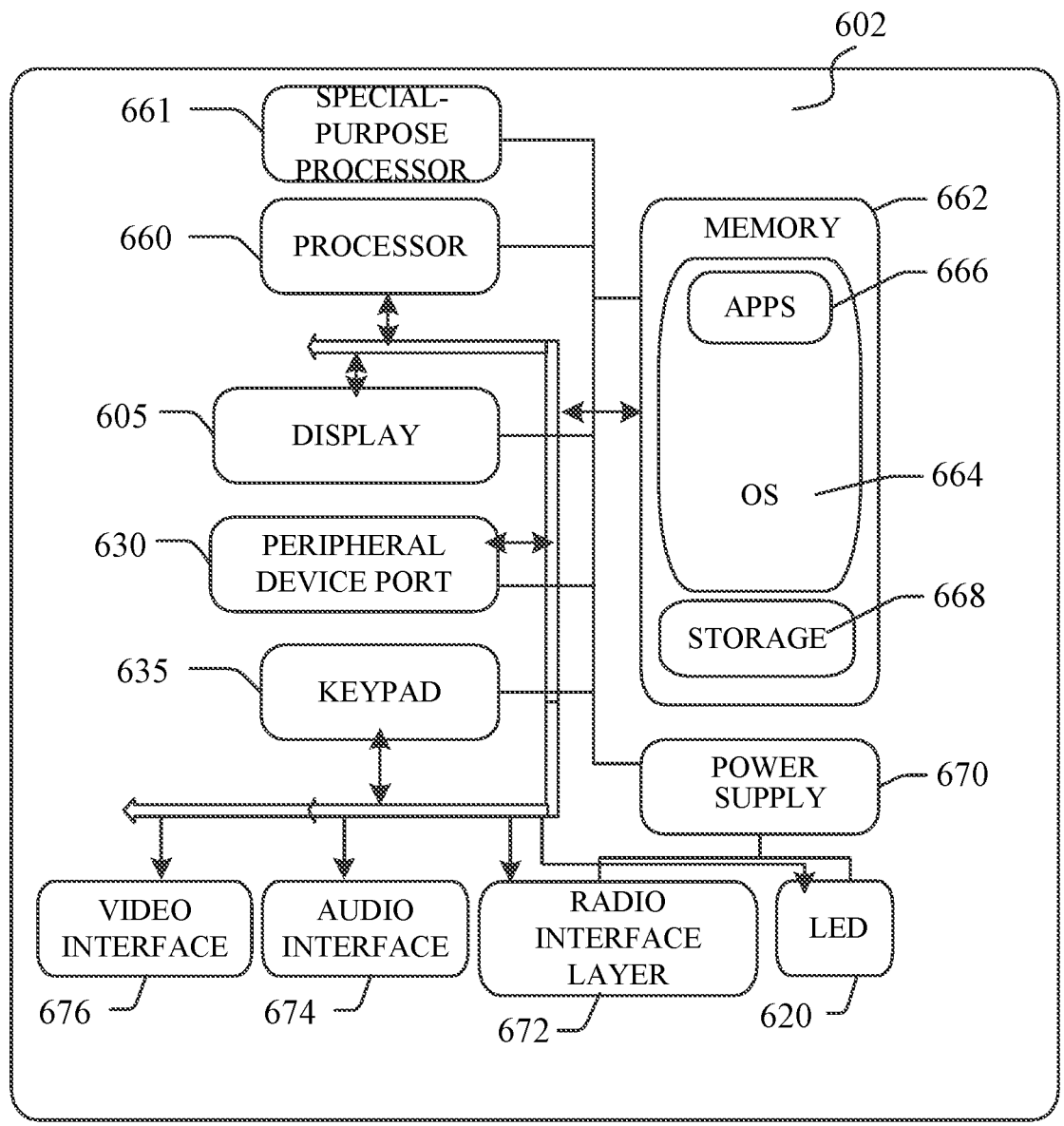

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor(s) (e.g., processor 660 and/or special-purpose processor 661) and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
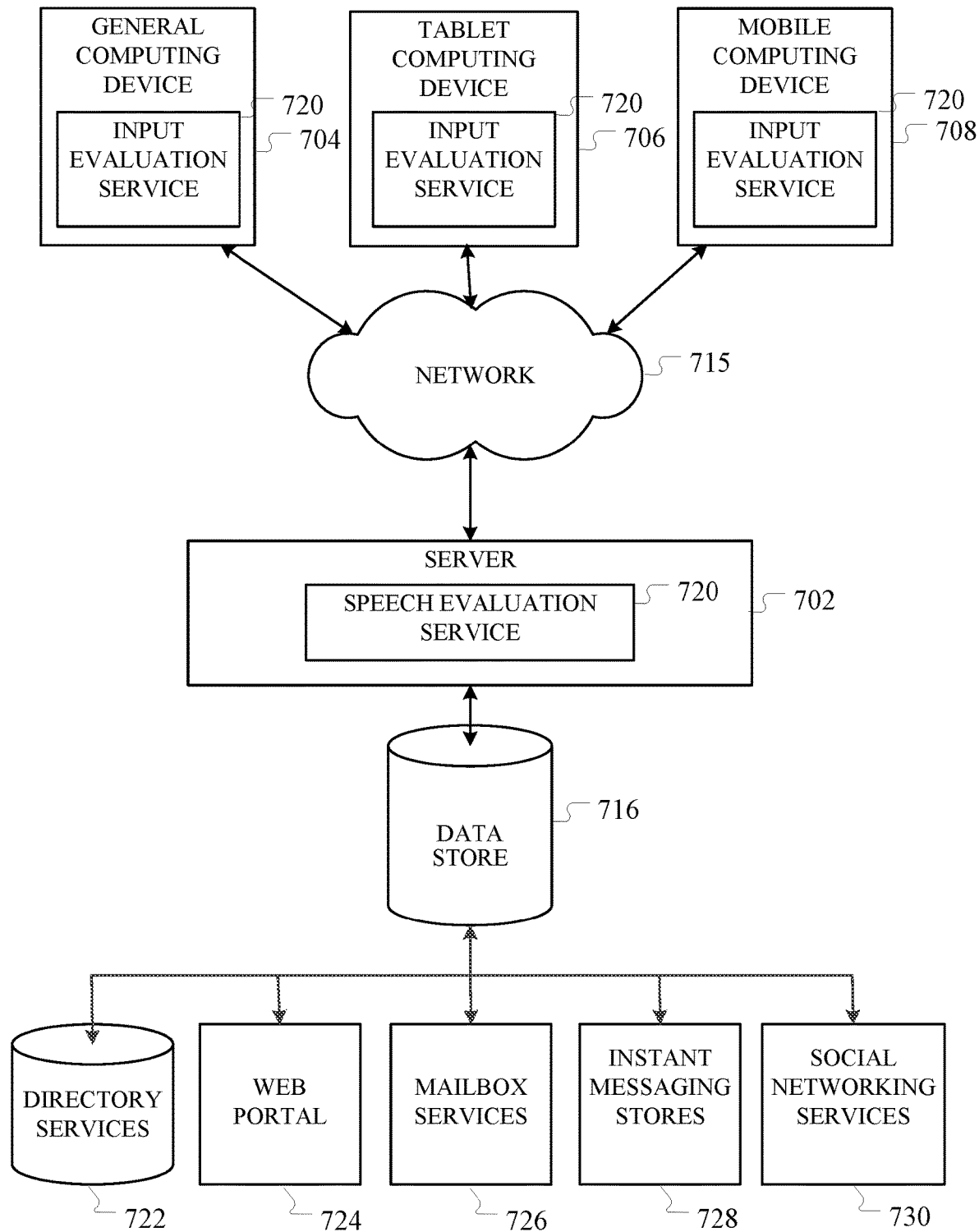
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

An input evaluation service 720 may be employed by a client that communicates with server device 702, and/or input evaluation service 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
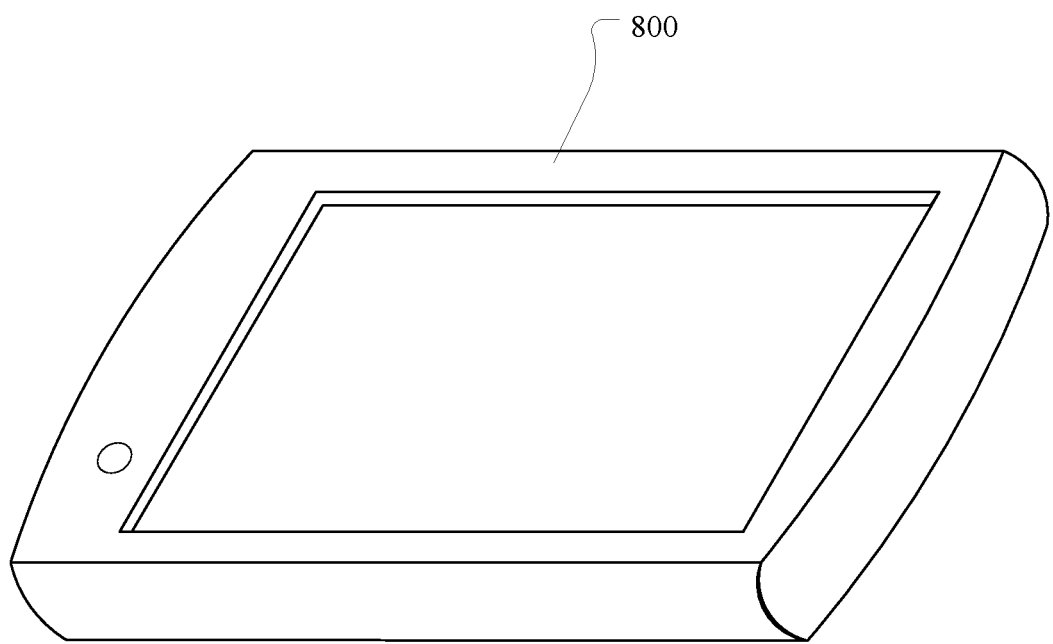
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   a processor; and
   a memory coupled to the processor, the memory comprising computer executable instructions that, when executed by the processor, performs a method comprising:
   detecting an access of audio content by a user, wherein the access of the audio content causes auditory presentation of the audio content to the user;
   identifying an acronym in the audio content;
   searching for the acronym and for a corresponding acronym expansion for the acronym in user-specific content, the user-specific content including a document associated with the user;
   determining that the acronym is not familiar to the user;
   generating a first confidence score for the corresponding acronym expansion based on a user-specific context, the user-specific context including at least one of the user's recency of interaction with the document and a user interaction type with respect to the document;
   comparing the first confidence score to a threshold value;
   determining that the first confidence score does not meet the threshold value;
   upon determining that the first confidence score does not meet the threshold value, generating a second confidence score for the corresponding acronym expansion based on a global context;
   generating a total confidence score for the corresponding acronym expansion by combining the first confidence score with the second confidence score; and
   based on the total confidence score, dynamically substituting the corresponding acronym expansion for the acronym during the auditory presentation of the audio content.

2. The system of claim 1, wherein identifying the acronym in the audio content comprises applying to the audio content at least one of: a natural language processing (NLP) algorithm or an audio recognition algorithm.

3. The system of claim 1, wherein identifying the acronym in the audio content comprises:
  accessing a text version of the audio content; and
  using text-based search tools to identify the acronym in the text version of the audio content.

4. The system of claim 3, wherein accessing the text version of the audio content comprises at least one of:
  receiving the text version of the audio content with the audio content;
  receiving a location of the text version of the audio content along with the audio content; or
  creating the text version of the audio content from the audio content.

5. The system of claim 1, wherein the user-specific content comprise at least one of:
  a graph database of the user;
  a user model of the user; or
  the document associated with the user.

6. The system of claim 1, wherein identifying the acronym expansion for the acronym comprises:
  creating the user-specific context for the acronym based on one or more resources associated with the user; and
  creating the global context for the acronym based on one or more global data sources.

7. The system of claim 6, wherein the one or more global data sources comprise an acronym list provided by at least one of:
  a search engine;
  a government entity; or
  an organization associated with the user.

8. The system of claim 6, wherein the global context for the acronym is further based on at least one of:
  a location of the user;
  a profession of the user; or
  a membership of the user.

9. The system of claim 1, wherein the first confidence score is generated based on a relationship between the user and one or more resources and the relationship between the user and the one or more resources describes at least one of:
  authorship of the one or more resources; or
  access information of the one or more resources.

10. The system of claim 1, wherein generating a first confidence score comprises:
  assigning an acronym expansion score to the acronym expansion in each of one or more resources associated with the user; and
  combining each acronym expansion score to generate the first confidence score.

11. The system of claim 1, wherein dynamically substituting the acronym expansion for the acronym comprises:
  comparing the total confidence score to the threshold value, wherein the threshold value is used to determine whether to substitute the acronym expansion for the acronym; and
  when the total confidence score meets or exceeds threshold value, dynamically substituting the acronym expansion for the acronym.

12. The system of claim 1, wherein the global context is derived using information associated with a user's geographical location.

13. A method comprising:
  detecting an access of audio content by a user device of a user, wherein the access of the audio content causes auditory presentation of the audio content using a media player of the user device;
  identifying an acronym in the audio content using an evaluation component accessible to the user device;
  determining that the acronym is not familiar to the user;
  upon determining that the acronym is not familiar to the user, identifying an acronym expansion for the acronym in one or more resources associated with the user;
  generating a first confidence score for the acronym expansion based on a user-specific context, the user-specific context including at least one of the user's recency of interaction with one of the one or more resources and a user interaction type with respect to the one of the one or more resources;
  comparing the first confidence score to a threshold value;
  determining that the first confidence score does not meet the threshold value;
  upon determining that the first confidence score does not meet the threshold value, generating a second confidence score for the acronym expansion based on a global context;
  generating a total confidence score for the acronym expansion by combining the first confidence score with the second confidence score; and
  when the total confidence score meets or exceeds the threshold value, substituting the acronym expansion for the acronym during the auditory presentation of the audio content.

14. The method of claim 13, wherein the audio content comprises at least one of:
  an audio file;
  a video file;
  broadcast data; or
  streaming data.

15. The method of claim 13, wherein the evaluation component is integrated into the media player of the user device.

16. The method of claim 13, wherein the evaluation component is integrated into the user device and is separate from the media player of the user device.

17. The method of claim 13, wherein identifying the acronym in the audio content comprises:
  providing the audio content to the evaluation component; and
  before the auditory presentation of the audio content using the media player, applying NLP algorithm or audio recognition algorithm to at least a portion of the audio content.

18. The method of claim 13, wherein generating the first confidence score comprises:
  assigning an acronym expansion score to the acronym expansion in each of the one or more resources associated with the user;
  applying a weighting value to each of the one or more resources associated with the user; and
  combining one or more of the acronym expansion scores and one or more of the weighting values to generate the first confidence score.

19. The method of claim 13, wherein dynamically substituting the acronym expansion for the acronym comprises:
  providing, by the evaluation component, to acronym expansion to the media player when the acronym occurs during the auditory presentation of the audio content.

20. A system comprising:
  a processor; and
  memory coupled to the processor, the memory comprising computer executable instructions that, when executed by the processor, performs a method comprising:

detecting an access of audio content by a user, wherein the access of the audio content causes auditory presentation of the audio content to the user;

identifying an acronym in the audio content;

determining that the acronym is not familiar to the user;

upon determining that the acronym is not familiar to the user, evaluating a user-specific context for the user to identify an acronym expansion for the acronym, wherein the user-specific context is based on one or more resources associated with the user and the user-specific context includes at least one of the user's recency of interaction with one of the one or more resources and a user interaction type with respect to the one of the one or more resources;

generating a first confidence score for the acronym expansion based on the user-specific context;

comparing the first confidence score to a threshold value;

determining that the first confidence score does not meet the threshold value;

upon determining that the first confidence score does not meet the threshold value, evaluating a global context to generate a second confidence score, wherein the global context is based on one or more resources of one or more entities associated with the user;

generating a total confidence score for the acronym expansion by combining the first confidence score with the second confidence score; and based on the total confidence score, dynamically substituting the acronym expansion for at least one instance of the acronym during the auditory presentation of the audio content.

21. The system of claim 20, wherein the one or more resources of the one or more entities associated with the user comprise one or more lists of acronyms and acronym expansions that are at least one of: popular, known, or recognized.

* * * * *